(12) United States Patent
Puyou et al.

(10) Patent No.: US 9,096,309 B2
(45) Date of Patent: Aug. 4, 2015

(54) METHOD FOR CONTROLLING THE PILOTING OF AN AIRCRAFT

(71) Applicant: Airbus Operations (SAS), Toulouse (FR)

(72) Inventors: Guilhem Puyou, Toulouse (FR); Matthias Eberle, Tournefeuille (FR); Fabien Perrin, Toulouse (FR); Javier Manjon Sanchez, Toulouse (FR)

(73) Assignee: AIRBUS OPERATIONS (SAS), Toulouse (FR)

( * ) Notice: Subject to any disclaimer, the term of this patent is extended or adjusted under 35 U.S.C. 154(b) by 0 days.

(21) Appl. No.: 13/886,440

(22) Filed: May 3, 2013

(65) Prior Publication Data
US 2013/0304283 A1 Nov. 14, 2013

(30) Foreign Application Priority Data
May 11, 2012 (FR) ...................................... 12 54316

(51) Int. Cl.
*B64C 19/00* (2006.01)
*G05D 1/08* (2006.01)
*G05D 1/10* (2006.01)

(52) U.S. Cl.
CPC .............. *B64C 19/00* (2013.01); *G05D 1/0808* (2013.01); *G05D 1/101* (2013.01)

(58) Field of Classification Search
CPC .... G08G 5/0013; G01C 23/00; G01C 23/005; G01S 1/02; H04L 29/06; G05D 1/0676; B64G 1/005; B64G 1/12; B64G 1/26; B64G 1/64
See application file for complete search history.

(56) References Cited

U.S. PATENT DOCUMENTS

| | | | |
|---|---|---|---|
| 5,001,646 A | 3/1991 | Caldwell et al. | |
| 5,420,582 A * | 5/1995 | Kubbat et al. | 340/974 |
| 5,745,863 A * | 4/1998 | Uhlenhop et al. | 701/14 |
| 6,320,579 B1 * | 11/2001 | Snyder et al. | 345/419 |
| 7,081,828 B2 * | 7/2006 | Low | 340/815.45 |
| 2002/0032528 A1 * | 3/2002 | Lai | 701/301 |
| 2003/0088342 A1 | 5/2003 | Godard et al. | |
| 2004/0093130 A1 | 5/2004 | Osder et al. | |
| 2005/0237226 A1 * | 10/2005 | Judge et al. | 340/946 |
| 2006/0238377 A1 * | 10/2006 | Stiles et al. | 340/979 |
| 2010/0084513 A1 * | 4/2010 | Gariepy et al. | 244/190 |
| 2011/0304617 A1 * | 12/2011 | Nishida et al. | 345/419 |

OTHER PUBLICATIONS

Search Report, Feb. 4, 2013.

* cited by examiner

*Primary Examiner* — John R Olszewski
*Assistant Examiner* — Nicholas K Wiltey
(74) *Attorney, Agent, or Firm* — Greer, Burns & Crain, Ltd.

(57) ABSTRACT

A method for controlling the piloting of an aircraft comprising the steps of receiving at least one first instruction for modification of a current velocity vector of the aircraft, determining a target velocity vector of the aircraft, on the basis of said at least one first instruction received, and determining, on the basis at least of said target velocity vector, at least one actuation command intended for at least one actuator of the aircraft in order to modify the movement of the aircraft according to said at least one first instruction received.

16 Claims, 7 Drawing Sheets

METHOD FOR CONTROLLING THE PILOTING OF AN AIRCRAFT

CROSS-REFERENCES TO RELATED APPLICATIONS

This application claims the benefit of the French patent application No. 1254316 filed on May 11, 2012, the entire disclosures of which are incorporated herein by way of reference.

BACKGROUND OF THE INVENTION

The present invention relates to a method for controlling the piloting of an aircraft.

In modern aircraft, movement is controlled by the pilot by means of throttle levers, side sticks and pedals. The flight control computer interprets the pilot's actions on these elements and controls the relevant control surfaces of the aircraft. These surfaces are controlled electrically and/or hydraulically.

FIG. 1 illustrates example control surfaces of an aircraft: the ailerons 10, spoilers 11, rudders 12, elevators 13, trimmable horizontal stabilizers 14, slats 15 and flaps 16.

The flight control computers of transport aircraft usually allow the pilot to control the attitude of the aircraft (pitch angle, bank angle or other) by giving, via the control column, instructions relating to the attitude of the aircraft or change of attitude. This control of the attitude of the aircraft allows the pilot to modify the orientation of the velocity vector VV of the aircraft and consequently the path thereof in space.

The orientation of this vector is defined by the track angle and the flight path angle.

The velocity vector of the aircraft is now included in the data presented to the pilot to assist the pilot in maneuvering the aircraft.

FIG. 2 illustrates a graphic interface of a head-up display.

This interface provides various data such as for example the speed scale 200, ground speed 201, bank angle 202, pitch scale 203, longitudinal aircraft reference 204, radio height of the aircraft 205, usually originating from a radio altimeter measurement, heading or track scale 206, vertical velocity 207, altitude 208.

The interface also comprises a sight 209 representing the point towards which the velocity vector of the aircraft is pointing.

Such an interface allows the pilot to know in real time the orientation of the velocity vector relative to the environment of the aircraft. Moreover, the pilot can see almost in real time how the orientation of the velocity vector changes as a function of his actions on the flight deck controls (side stick, joystick, etc.). On landing, the pilot is also assisted by being able to ensure that he keeps the sight representing the velocity vector on the landing runway, thus guaranteeing a precise approach to the runway.

The inventors have however considered that improvements could be made to the way in which an aircraft is piloted, by using this type of interface.

The inventors have noticed that there is a latency between the moment when the pilot notes the presence of the sight on a point and actuates the components of the airplane, and the moment when he can note the result of these actions on the velocity vector (new position of the sight) in order to actuate the components of the airplane once again. This latency can in particular be due to the response time of the actuators and to the aircraft flight dynamics.

Thus, the pilot must anticipate these dynamics and predict the result on the velocity vector of the various actions that he carries out. The pilot must in fact decide to bring the sight from point A towards point B and find the right actions to implement in order to do this (determine the control surfaces to be used and determine the appropriate action on these surfaces).

The inventors have therefore exposed a need to improve the piloting mode of aircraft.

SUMMARY OF THE INVENTION

The present invention falls within this context.

A first aspect of the invention relates to a method for controlling the piloting of an aircraft comprising the following steps of:
  receiving at least one first instruction for modification of a current velocity vector of the aircraft,
  determining a target velocity vector of the aircraft, on the basis of said at least one first instruction received, and
  determining, on the basis at least of said target velocity vector, at least one actuation command intended for at least one actuator of the aircraft in order to modify the movement of the aircraft according to said at least one first instruction received.

It is thus possible to make it easier to take control of and pilot the aircraft.

In order to simplify the piloting by the crew, the velocity vector can be displayed on a graphic interface in which the velocity vector is represented relative to the view of the external environment from the flight deck.

The present invention can be useful in particular in the event of disturbed conditions such as turbulence or gusting winds. The simplification of piloting as well as the introduction of a higher level of feedback control (feedback control of the velocity vector in addition to feedback control of attitude control) makes it possible to hold the path in space more accurately.

The simplification of piloting allows the pilot to deal with critical situations more easily, which improves the safety of the aircraft.

The pilot can use the side stick to change the target velocity vector, which reduces the number of operations for the pilot and makes it possible to define instructions close to the result that can be seen by the pilot on the piloting interface (head-up display for example).

As the movement of the aircraft is defined by the pilot in terms of velocity vector, he no longer has to determine the different movement parameters (bank angle, pitch angle, etc.) in order to steer. The display of the target velocity vector (in addition to the current velocity vector) makes it possible to reduce the need for anticipation by the pilot.

On the basis of the target velocity vector, the control surfaces to be operated as well as the associated commands are defined automatically.

In comparison with the piloting modes of the prior art, the piloting mode according to embodiments of the invention requires less activity on the part of the pilot (fewer operations and less mental anticipation). This therefore reduces the pilot's reaction time. This also limits the risks of incorrect operation.

For example at least one actuator is capable of setting a control surface of the aircraft in motion.

Thus, the pilot can act directly on the orientation of the velocity vector of the aircraft.

At least one instruction for modification of the current velocity vector of the aircraft can relate to a track angle and/or a flight path angle.

These angles make it possible to define the target velocity vector simply and directly.

The method can further comprise the following steps of:
receiving an instruction for modification of the target velocity vector determined, and
modifying the target velocity vector as a function of said received command, said actuation command being determined on the basis of the thus-modified target velocity vector.

Thus, it is possible to define the target velocity vector directly, without reference to the current velocity vector.

This direct definition can for example be implemented by using the interface for selection of the automatic pilot settings (the automatic pilot can in certain airplanes be denoted by FCU, for "Flight Control Unit").

This direct definition, by the pilot or the automatic pilot, can be more rapid, for example in case of an emergency or loss of bearings.

For example, the method also comprises the following steps of:
detecting the setting in motion of a piloting interface,
determining said at least one modification instruction as a function of the detected movement.

Thus, the pilot can determine the target velocity vector by operating a piloting element such as for example a side stick or a graphic interface element.

The method can further comprise a step of generating at least one graphic piloting interface display signal comprising a representation of said current velocity vector, said signal being configured to cause the display of a representation of the target velocity vector.

This step is not meant to carry out a simple presentation of the cognitive content of the target velocity vector, but is meant to offer a particular arrangement of this information in order to allow the pilot to interact effectively with the aircraft.

The display according to this step offers a technical effect that is manifested at the level of the mental activity of the user by allowing him to choose an attitude to give to the aircraft and realize more quickly, more efficiently and more safely, the maneuvers that he is carrying out on the aircraft.

The method can further comprise a step of generating a display signal configured to cause the display of an element for aiding alignment with a target piloting path, said element being associated with said graphic representation of the target velocity vector.

The alignment aid can in particular make it possible to facilitate landing on the runway.

For example, the method can further comprise a step of generation of a warning signal in the event of an anomaly in the alignment with the target path and/or an anomaly in the correlation between the target velocity vector and the target path.

Thus, it is possible to improve the safety of the aircraft in the event of incorrect operation.

A second aspect of the invention relates to a computer program as well as a computer program product and a storage medium for such a program and product, allowing the implementation of a method according to the first aspect when the program is loaded and executed by a processor of an aircraft piloting control system.

A third aspect of the invention relates to an aircraft piloting control system.

This system comprises a processing unit configured to implement a method according to the first aspect. The processing unit is in particular configured to receive at least one first instruction for modification of a current velocity vector of the aircraft, to determine a target velocity vector of the aircraft, on the basis of said at least one first instruction received and to determine, on the basis at least of said target velocity vector, at least one actuation command intended for at least one actuator of the aircraft in order to modify the movement of the aircraft according to said at least one first instruction received.

The processing unit can moreover be configured to generate at least one graphic piloting interface display signal comprising a representation of said current velocity vector, said signal being configured to cause the display of a representation of the target velocity vector.

The processing unit can further be configured to generate a display signal configured to cause the display of an element to aid alignment with a target piloting path, said element being associated with said graphic representation of the target velocity vector.

The system according to the third aspect can comprise other elements for implementing other features mentioned for the method according to the first aspect in terms of the method. The processing unit can further be configured to allow the implementation of these features.

A fourth aspect of the invention relates to an aircraft comprising a system according to the third aspect, for example an airplane.

The subject-matter according to the second, third and fourth aspects of the invention provides at least the same advantages as those provided by the method according to the first aspect.

BRIEF DESCRIPTION OF THE DRAWINGS

Other features and advantages of the invention will become apparent on reading the present detailed description which follows, by way of a non-limitative example, and from the attached figures among which.

DETAILED DESCRIPTION OF THE PREFERRED EMBODIMENTS

A new approach to piloting aircraft is described below. This piloting is simplified by the definition, by the pilot, of the attitude of the aircraft directly by means of the velocity vector. This definition can be given via a side stick and a control screen. The pilot directs the target velocity vector on the control screen, and then the aircraft flight control system locks the current velocity vector on the target velocity vector thus defined by the pilot.

The pilot can directly control the result of his actions on the components of the aircraft by defining a target velocity vector.

Before describing a control system according to embodiments and an associated method in greater detail, the variables used to define the velocity vector are first described.

Figure 3:
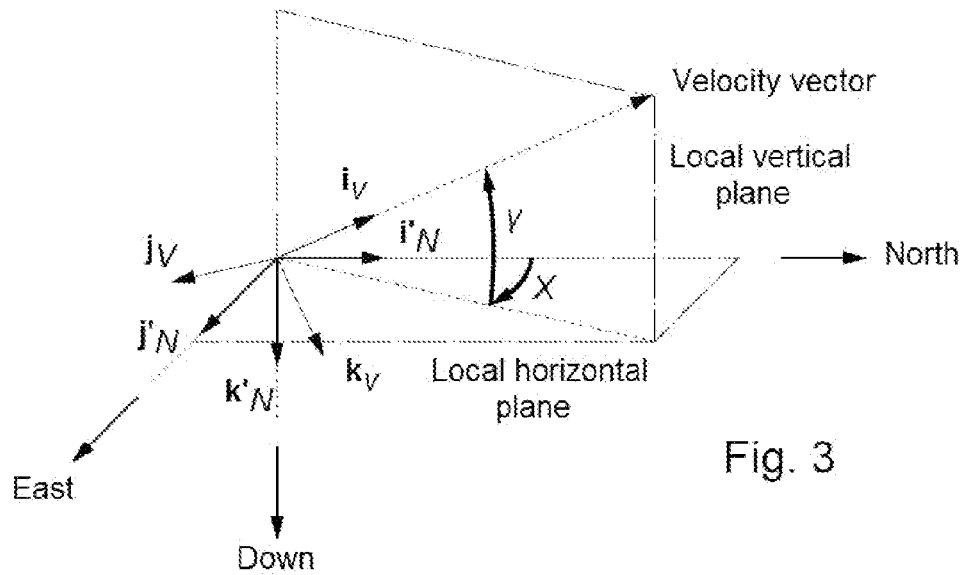
FIG. 3 illustrates the angles used to define the velocity vector.

FIG. 3 is a diagram representing the flight path angle γ (gamma) and the track angle χ (chi).

The velocity vector VV of the aircraft is defined in the space defined by the local tangent plane and the vertical (this space is called the "North-East-Down frame"). The basis vectors of this space i'N, j'N and k'N correspond to the geographic north, the geographic east and the downward vertical (direction of gravity) respectively. The plane (i'N, j'N) defines the local tangent plane (or local horizontal plane).

A base formed by the vectors iV, jV and kV is associated with the aircraft.

The vector iV bears the velocity vector. The vector iV forms with the local tangent plane the angle γ (gamma). The angle χ (chi) is the angle between the projection of the velocity vector in the local tangent plane and the vector i'N.

These angles are used below to describe the control of the aircraft as a function of the velocity vector.

Figure 4:
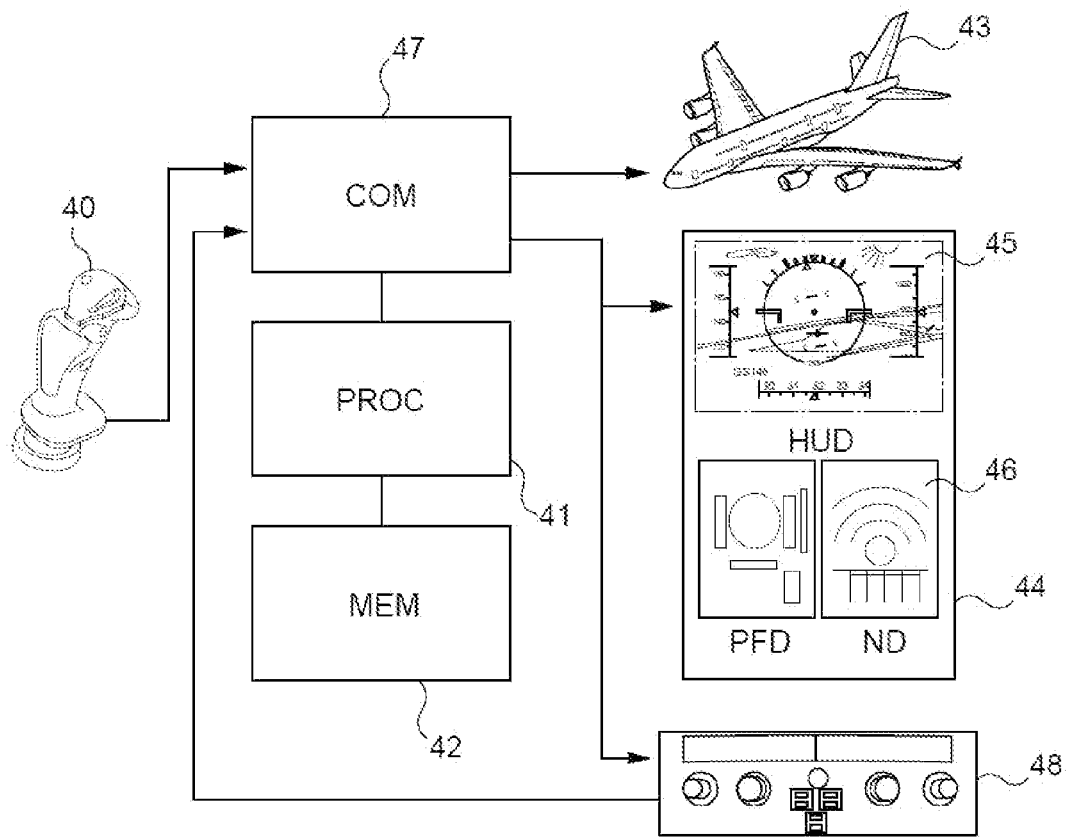
FIG. 4 illustrates a control system structure according to embodiments.

FIG. 4 describes a general structure of an aircraft flight control system according to embodiments of the invention.

The pilot actuates a side stick 40 the movement of which causes the generation of an actuation signal. This actuation signal is received by a communication unit 47 that transmits it to a processing unit 41.

The processing unit 41 converts the actuation signal to a signal for an instruction for modification of the current velocity vector of the aircraft.

On the basis of the instruction signal, the processing unit determines a target velocity vector desired by the pilot.

To this end, the processing unit can use various data relating to the current state of the aircraft such as for example the true air speed of the aircraft (VTAS, TAS is an acronym of "True Air Speed"), the flight path angle (FPA), the track angle (TRK), or other. The processing unit can further use other data such as for example the mass of the airplane, the centre of gravity, the high-lift configuration, or other.

For example, all these data are stored in a memory unit 42.

Once the target velocity vector has been determined, the processing unit can generate control signals intended for the control surfaces of the aircraft, or more precisely intended for the actuators 43 of these surfaces. These control signals are configured to modify the movement of the aircraft so that the current velocity vector coincides with the target velocity vector. In other words, the velocity vector is locked on the target velocity vector. The control signals are for example transmitted to the actuators via the communication unit 47.

Moreover, the processing unit can also be configured to generate a display signal intended for a display unit 44 comprising for example a control screen 45 of the head-up display type and PFD and ND ("Primary Flight Display" and "Navigation Display") type screens 46. This display signal is capable of causing the display in the graphic piloting interface displayed on the control screen, of a graphic element representing the target velocity vector as determined by the processing unit on the basis of the pilot's setting. The display signals are for example transmitted to the display unit via the communication unit.

Alternatively, or in combination, the display signal can be transmitted to the flight control unit 48 (FCU). This unit can be the interface between the pilot and the automatic pilot. This unit can be configured to generate a signal directly representing the target velocity vector desired by the pilot. To this end, the flight control unit can comprise an interface such as for example keys or knobs allowing the pilot to define the target velocity vector. For example, the pilot enters the values of the flight path angle γ (gamma) and track angle χ (chi). The signal generated representing the target velocity vector is then supplied to the processing unit, for example via the communication unit. The interface of the unit 48 can also comprise an interface displaying the flight path angle γ (gamma) and track angle χ (chi) of the current velocity vector.

Generally, the memory unit 42 comprises a random access memory for the non-permanent storage of calculation data used during the implementation of a method according to an embodiment. The memory unit also comprises a non-volatile memory (for example of the EEPROM type) for storing for example a computer program according to an embodiment for its execution by a processor (not shown) of the processing unit 41. The memory can also store the data relating to the status of the aircraft as already mentioned and correlation maps making it possible to interpret the movements of the side stick (for example the map represents the curve of FIG. 6 described below).

Figure 5:
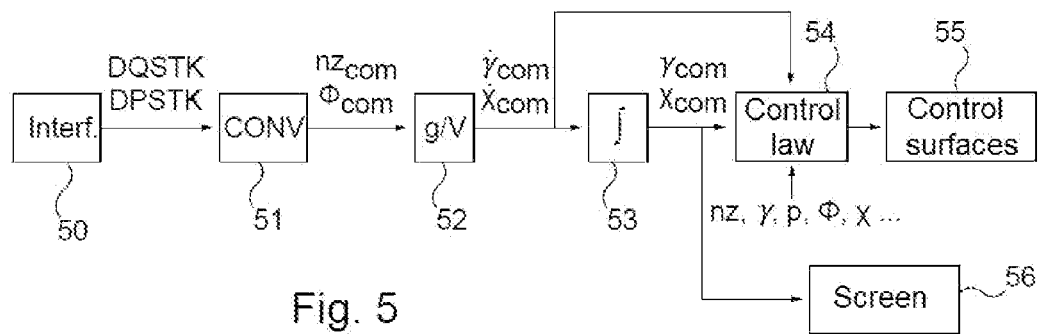
FIG. 5 is a block diagram illustrating a processing unit according to embodiments.

FIG. 5 is a block diagram illustrating in greater detail the operation of the processing unit of the system according to FIG. 4.

It is assumed that the pilot of the aircraft has a side stick that can swivel on two axes: a pitch axis (back and forth movement of the side stick) and a roll axis (left to right movement of the side stick). For example, each type of swiveling of the side stick controls the modification of an angle of the current velocity vector.

Thus, a control unit of the side stick 50 determines the current movement of the side stick and generates at least one DQSTK and/or DPSTK signal respectively associated with the movement on the pitch and roll axes of the side stick.

Figure 6:
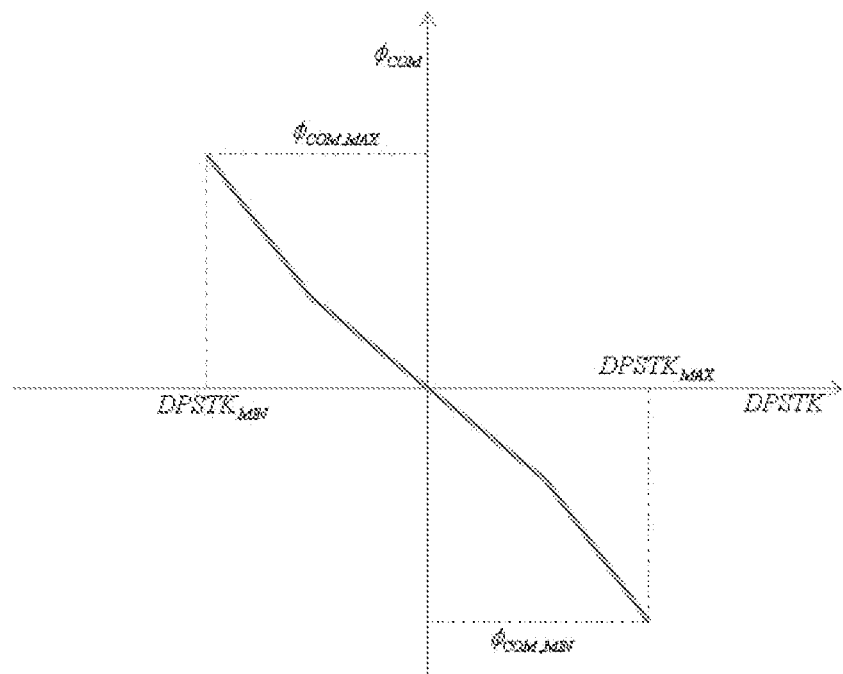
FIG. 6 is an example conversion curve of the movement of a side stick for controlling a bank angle modification.

The movement of the side stick on the roll axis is converted by a conversion unit 51 to a bank angle ΦCOM (PhiCOM) of the velocity vector according to a characteristic curve, for example as illustrated by FIG. 6.

The curve of FIG. 6 represents the variation in the bank angle controlled between ΦCOM,MAX and ΦCOM,MIN as a function of the bank angle of the side stick between DPSTKMIN and DPSTKMAX.

Returning to FIG. 5, the movement of the side stick on the pitch axis is converted by the conversion unit 51 controlling the load factor nzCOM according to another characteristic curve (not shown).

The bank angle ΦCOM is then delivered to a gain unit 52 in order to convert it to a track angle rate $\dot{\chi}_{COM}$. For example, the conversion is carried out according to the following formula:

$$\dot{\chi}_{COM} = \frac{g}{V_{GND}} \cdot \phi_{COM},$$

where g is the gravitational constant and VGND is the ground speed.

The signal originating from the gain unit 52 representing the track angle rate is supplied to an integration unit 53 that makes it possible to carry out an integration operation on the track angle rate and obtain a signal representing the track angle according to the formula $\chi_{COM} = \int \dot{\chi}_{COM} dt$.

The load factor command nzCOM is also supplied to the gain unit 52 which supplies at the output a signal representing the flight path angle derivative. For example, the conversion is carried out according to the following formula:

$$\dot{\gamma}_{COM} = \frac{g}{V_{TAS}} \cdot nz_{COM},$$

where g is the gravitational constant and VTAS is the true air speed of the aircraft.

The signal originating from the gain unit 52 representing the flight path angle derivative is supplied to the integration unit 53, which makes it possible to carry out an integration operation on said derivative and obtain a signal representing the flight path angle according to the formula $\gamma_{COM} = \int \dot{\gamma}_{COM} dt$.

When the pilot actuates the side stick then releases it, the flight path angle and/or the track angle is modified, then remains constant.

At the output of the integration unit 53, the signal representing the track angle commanded or the flight path angle commanded is delivered to a control law unit 54. This control law unit is configured to determine, on the basis of the current status of the aircraft, the commands to be generated intended for the actuators of the control surfaces (represented by a surface control unit 55). In particular, the current status of the aircraft can be defined by the current track angle χ, the current flight path angle γ, the current bank angle Φ, the current load factor $n_z$, the pitch rate q, the yaw rate r, the sideslip angle β and the roll rate p. The control law unit can also use the signal or signals originating from the gain unit 52.

By way of example it is possible to use, on the pitch axis, the cascading of feedback control and path angle maintenance law (LAW no. 1) with a load factor control law (LAW no. 2). Thus the depth DQ control surface order can be calculated as follows:

$DQ = K1*q + K2*n_z + K3*\int(n_z - nzc) + K4*nzc$    LAW no. 2:

$nzc = K5*(\gamma - \gamma COM) + K6*n_z + K7*nzCOM$    LAW no. 1:

The variables K1, K2, K3, K4, K5, K6 and K7 are for example the feedback control gains of the laws the settings of which depend on the aircraft and the design objectives (slave response time, disturbance rejection, or other). LAW no. 2 is for example identical to the pre-existing longitudinal manual flying law. LAW no. 1 can be a derivative of the pre-existing flight path angle feedback control law of the automatic pilot. In order to have a disturbance rejection identical to the automatic pilot (AP) in the absence of movement of the pilot's control column, the gain K5 of the AP law can be retained. The gains K6 and K7 are introduced and set in order to return to the behavior of the manual law on an order of the pilot using the side stick.

On the roll and yaw axes, it is similarly possible to use the cascading of a feedback control and track holding law (LAW no. 3) with a simultaneous roll and yaw control law (LAW no. 4) named Ystar. Thus, the overall order on the roll surfaces DP and the direction control surfaces DR can be calculated as follows:

$DP = K12*p + K13*r + K14*\phi + K15*\beta + K16*\dot{\phi}_c$ $DR = K21*p + K22*r + K23*\phi + K24*\beta + K25*\dot{\phi}_c$    LAW no. 4:

$\dot{\phi}_c = K8*(K9*(\chi - \chi COM) - \phi) + K10*p + K11*\Phi COM$    LAW no. 3:

The variables K12, K13, K14, K15, K16, K21, K22, K23, K24, K25, K8, K9, K10 and K11 are for example the feedback control gains of the laws the settings of which depend on the aircraft and the design objectives (slave response time, disturbance rejection etc.). LAW no. 4 is for example identical to the pre-existing lateral manual flying law. LAW no. 3 is a derivative of the pre-existing track angle feedback control law of the automatic pilot. In order to have a disturbance rejection identical to the automatic pilot in the absence of movement of the pilot's control column, the gains K8 and K9 of the AP law are retained. The gains K10 and K11 are introduced and set in order to return to the behavior of the manual law on an order of the pilot using the side stick.

In order to generate the display signal of the target velocity vector, a display control unit 56 receives the output from the integration unit 53.

The processing unit, for example with a structure as described with reference to FIG. 5, can make it possible to operate the control surfaces of the aircraft in order to bring the current velocity vector of the aircraft to coincide with the target velocity vector defined by the pilot by means of the side stick (or the FCU 48).

For example, the control law unit comprises two sub-units. One sub-unit makes it possible to slave the track angle of the aircraft and one sub-unit makes it possible to slave the flight path angle.

The processing unit can be further configured to satisfy flight quality criteria defined in the aviation regulations.

The processing unit can moreover be configured to automate the feedback control in such a way that the behavior of the aircraft remains similar to that which it would have with a standard piloting control method (in order not to disturb a pilot transferring from one piloting mode to the other).

It is further possible to put the processing unit in alternate operation with the automatic pilot. Thus, for example, when no activity is detected on the side stick, the piloting can be taken over by the automatic pilot.

The determination of a target velocity vector, in order to then lock the velocity vector of the aircraft on it, can be coupled with a graphic interface mechanism making it possible to improve the interaction of the pilot with the aircraft, thus improving piloting in terms of efficiency and safety.

Figure 7:
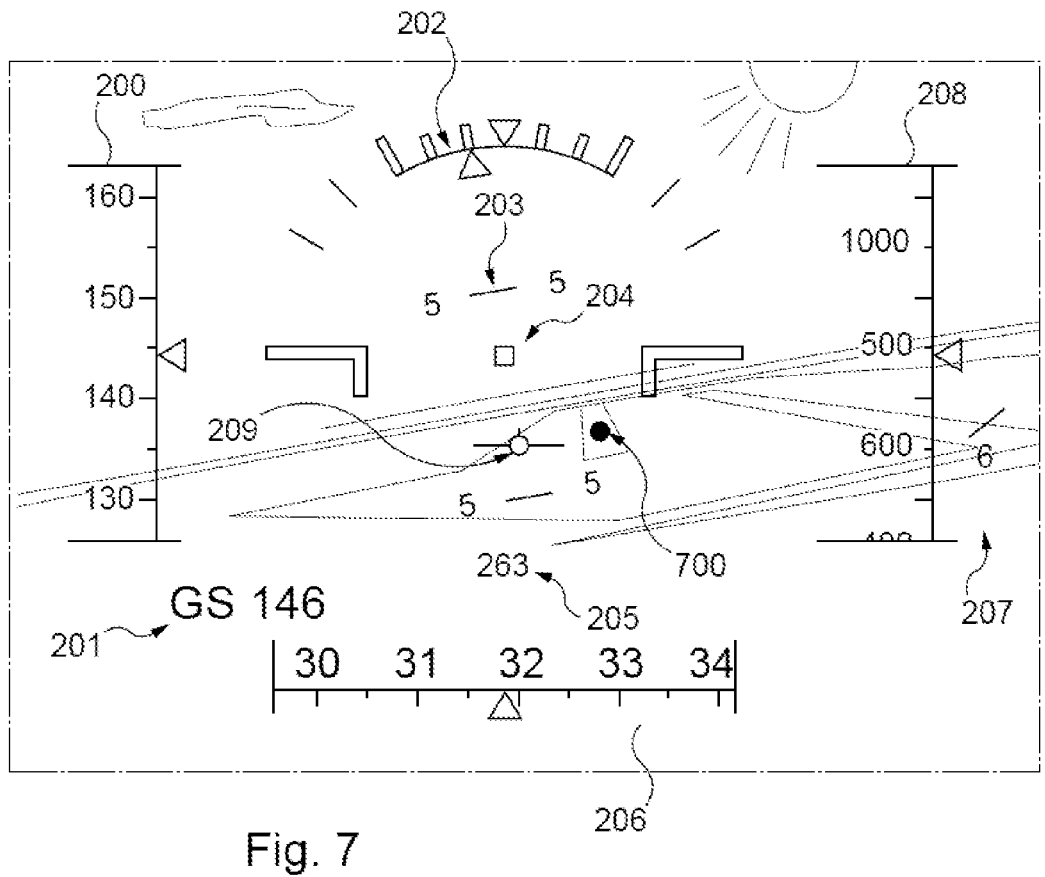
FIGS. 7 to 9 illustrate graphic interfaces according to embodiments.

FIG. 7 illustrates a graphic interface making it possible to display a representation of the target velocity vector as defined by the pilot via the side stick (or the FCU).

Figure 1:
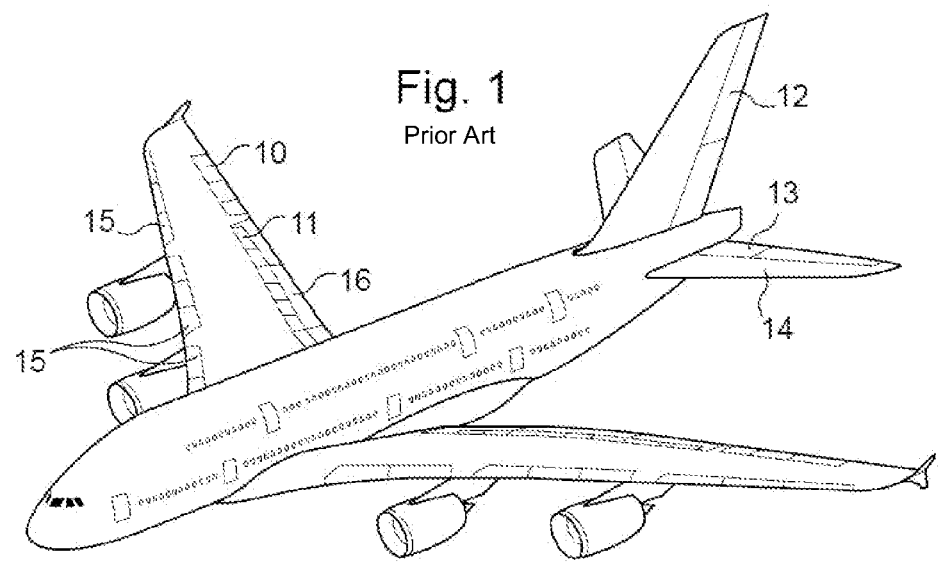
FIG. 1 illustrates example control surfaces of an aircraft of the prior art.
Figure 2:
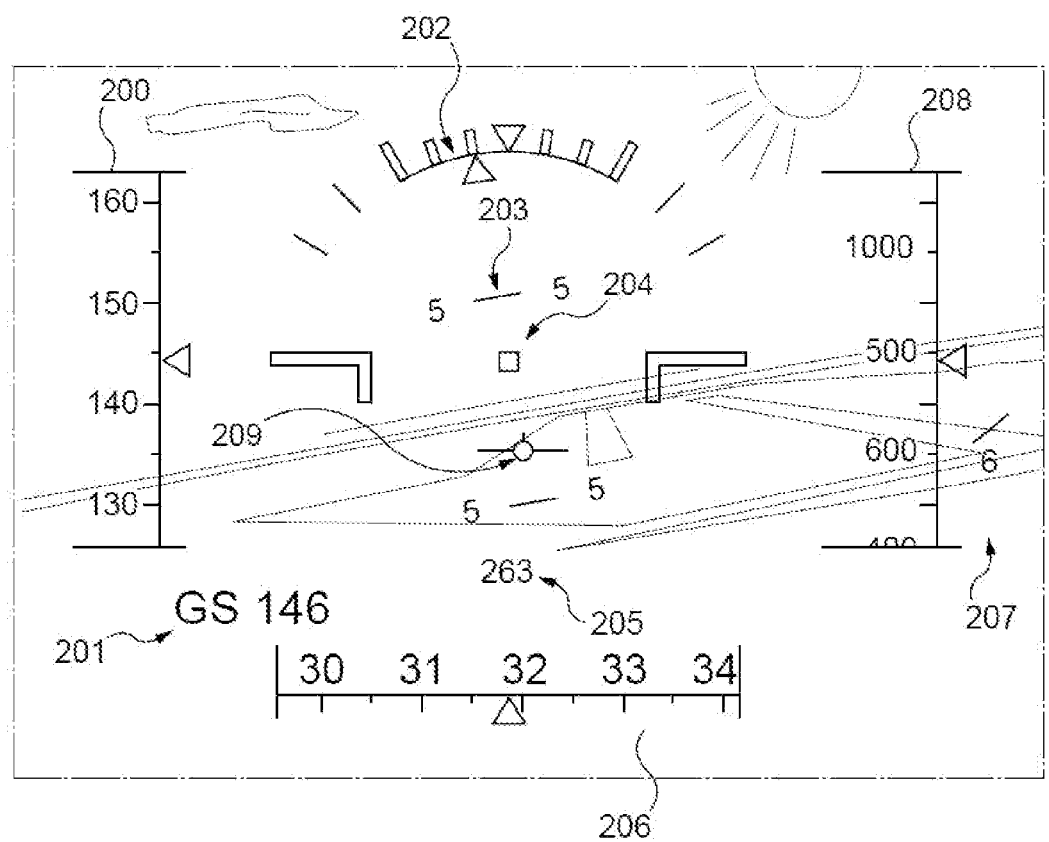
FIG. 2 illustrates a graphic interface of a head-up display of the prior art.

This figure shows the interface presented in FIG. 2. In the interface according to FIG. 7, a dot 700 represents the direction of the target velocity vector. The dot 700 (or any other type of indication) moves in real time as a function of the actions of the pilot on the side stick.

Moreover, it is possible to use an alignment aid mechanism.

This mechanism can be activated or deactivated by the pilot. Alternatively, or in combination, this mechanism can be activated or deactivated automatically as a function of one or more parameters. For example, this parameter can be altitude relative to the ground.

Such an alignment mechanism can be useful in accurately aligning the aircraft with a landing runway.

It can be the display of a vertical line on the screen at the level of the point representing the direction of the target velocity vector.

Figure 8:
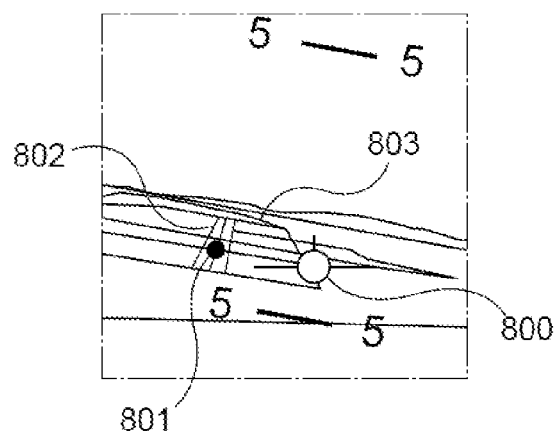

FIG. 8 represents an interface using the alignment aid mechanism.

This interface comprises a sight 800 representing the direction of the current velocity vector of the aircraft, a dot 801 (or any other graphic indication) representing the direction of the target velocity vector and a vertical line 802 allowing the pilot to align the aircraft with the landing runway 803.

The vertical line rotates in the interface as a function of the bank angle so that it remains perpendicular to the lines of the pitch scale 203.

The vertical line can be slightly offset relative to the indication representing the direction of the target velocity vector in order to leave a visible space for the sight when the target velocity vector and the current velocity vector coincide.

Figure 9:
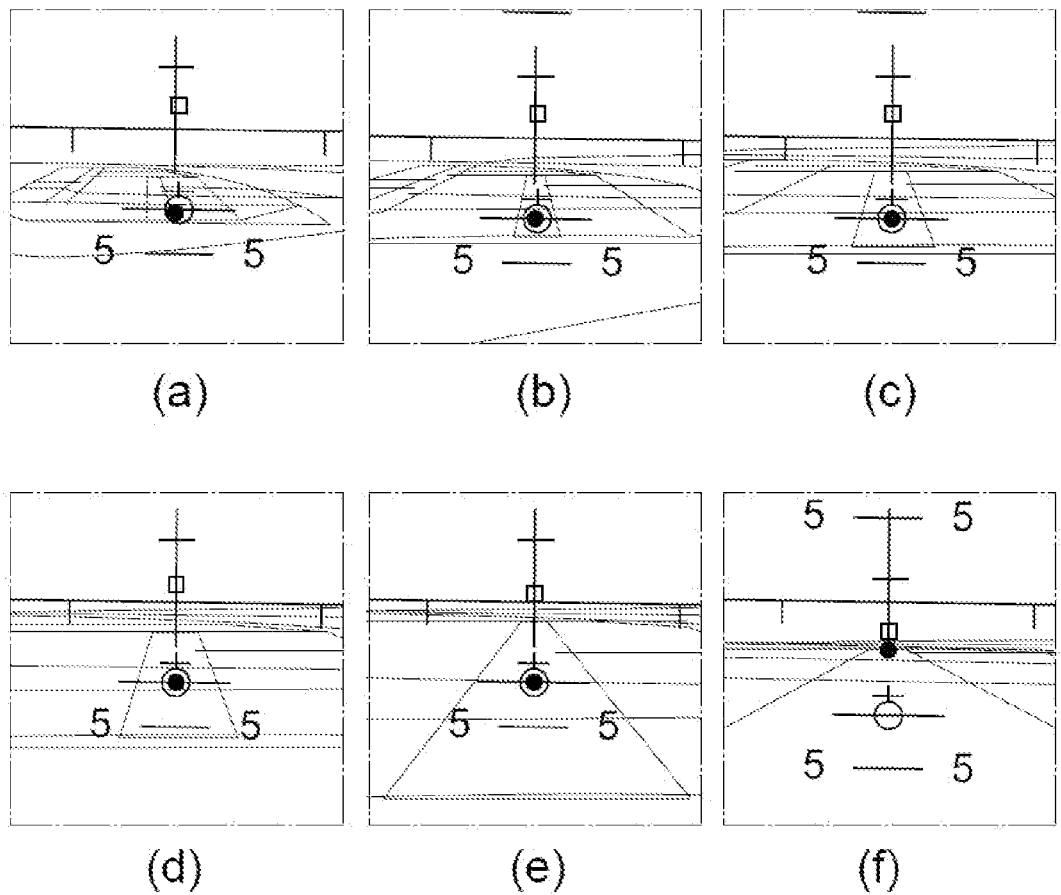

FIG. 9 represents a series of screenshots illustrating the alignment aid mechanism in the context of a landing procedure.

First of all, the pilot intercepts the centre line of the landing runway by placing the dot representing the target velocity vector to the right of the start of the centre line of the landing runway (a). Then, as the aircraft approaches the runway, the pilot moves the dot forward on the centre line.

The pilot can accurately correct the deviations of the aircraft relative to the runway as illustrated in screenshot (b). He can ensure the alignment of the vertical alignment aid line with the centre line of the runway, which brings the aircraft into position in the direction of the runway.

In screenshots (c), (d) and (e), there is no need for correction because the current velocity vector, represented by the sight, exactly follows the target velocity vector, represented by the dot.

The screenshot (f) shows a gap in the tracking of the target velocity vector by the current velocity vector due to the flare just before the landing. However, the alignment aid can still move correctly on the runway.

According to embodiments, visual and audible warnings can be transmitted in the flight deck in the event of detection of incorrect alignment with the runway and/or the selection by the pilot of the wrong runway (for example the dot representing the target velocity vector is positioned on the wrong runway).

This warning can be implemented according to the current altitude originating from a radio measurement, for example below a threshold.

Figure 10:
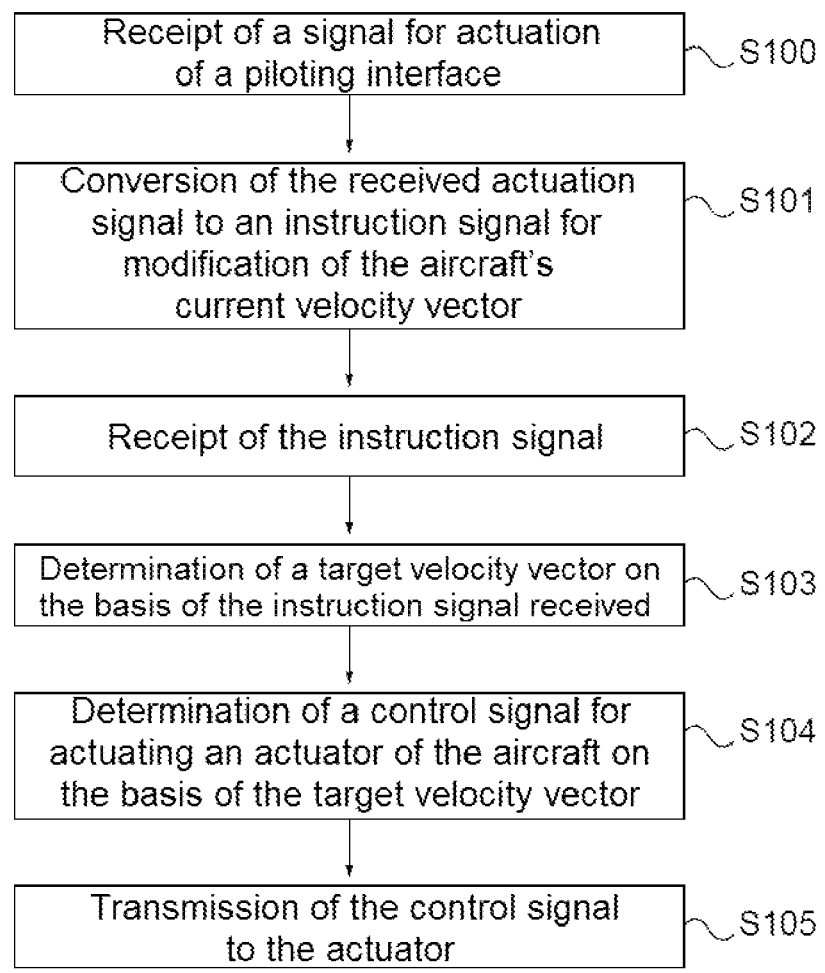
FIGS. 10 to 12 are flowcharts of method steps according to embodiments.

FIG. 10 is a flowchart of steps of a method for controlling the piloting of an aircraft according to an embodiment. This method can for example be implemented by a system according to FIG. 4.

During a first step S100, an actuation signal is received from a piloting interface. For example, it is a signal emitted after a side stick is moved. Other piloting interfaces can be envisaged. In addition to the FCU already mentioned in the present description, a piloting interface can be a graphic interface on a touch screen or associated with piloting control selection keys.

Once the actuation signal is received, it is converted in a step S101 to an instruction signal for modification of the current velocity vector of the aircraft. The actuation signal is interpreted, for example using a correlation curve as illustrated by FIG. 6.

Steps S100 and S101 are for example implemented by a control unit of the piloting interface.

The instruction signal generated is then transmitted to the processing unit which receives it during a step S102.

The instruction signal is then processed to determine a target velocity vector during a step S103.

During step S104, an actuation signal of an actuator of the aircraft is determined on the basis of the instruction signal received. This actuation signal is intended to actuate one or more components of the aircraft making it possible to modify the current velocity vector in order to bring it to coincide with the target velocity vector. For example, the actuators are associated with the control surfaces of the aircraft.

During a step S105, the control signal is transmitted to one or more actuators.

The process illustrated by FIG. 10 can be supplemented by a graphic interface process, described with reference to FIG. 11.

During a step S110, a signal for the display of a representation of the current velocity vector is generated, it is then transmitted during a step S111 to a pilot interface device, for example a screen. The current velocity vector can for example be represented by a sight in the centre of a screen showing the pilot a view towards the front of the aircraft.

During a step S112, the signal representing the target velocity vector is received (for example, the one determined during the step S103 mentioned with reference to FIG. 10).

On the basis of this signal, during step S113 a display signal representing the target vector is generated. For example, it is a marker (such as for example a dot) displayed on a screen that indicates the direction of this vector.

The display signal is then transmitted to the pilot interface device during step S114.

As already mentioned above in the present description, an alignment aid mechanism can be used. A process for using this mechanism is described with reference to the flowchart in FIG. 12.

During a step S120, a signal for activation of the alignment aid mechanism is received. For example, this signal is generated following the activation of the mechanism by the pilot via an interface button. Alternatively, or in combination, this signal is generated automatically when the aircraft descends below a threshold altitude relative to a radio measurement that characterizes for example a phase of approaching the ground for landing.

Then, once the mechanism is activated, a signal for the display of an alignment aid element is generated during a step S121.

This signal is then transmitted to the pilot interface device during a step 122. As already described, the element changes as a function of the movement of the aircraft.

Figure 11:
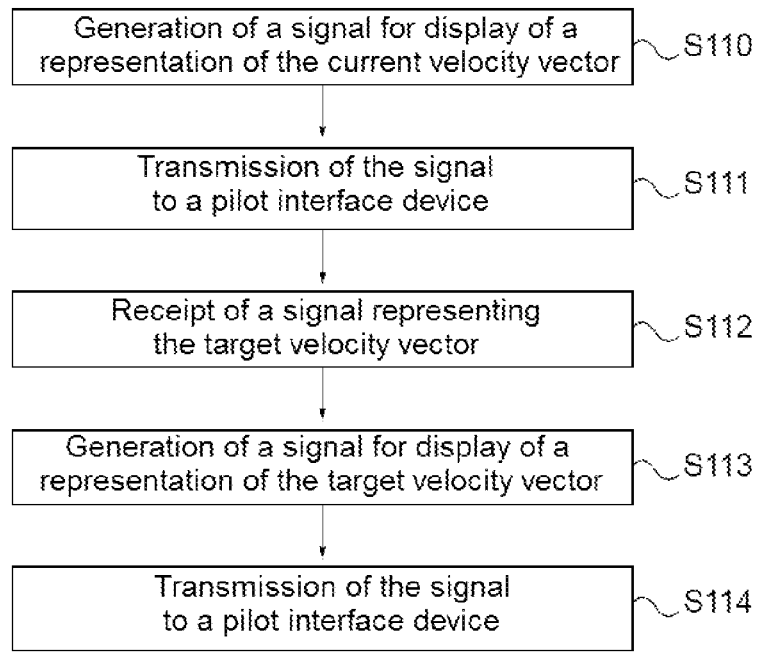
Figure 12:
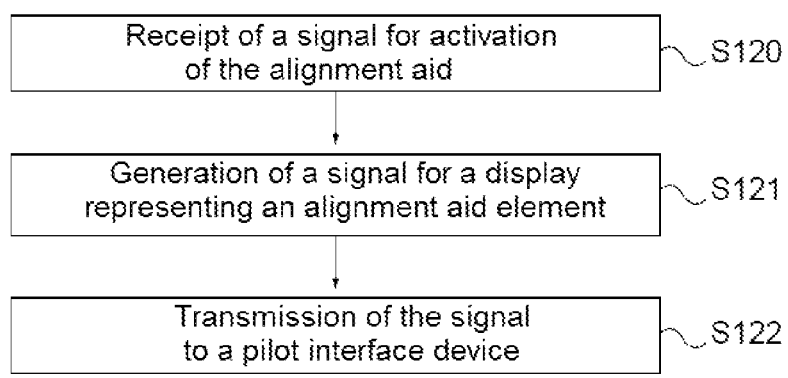

A computer program for the implementation of a method according to an embodiment of the invention can be produced by a person skilled in the art on reading the flowcharts in FIGS. 10, 11 and 12 and the present detailed description.

The present invention has been described and illustrated in the present detailed description and in the figures. Of course, the present invention is not limited to the embodiments described; other variants and combinations of features are possible. The description of a feature in an embodiment does not exclude the possibility of using this feature in another embodiment. These variants and embodiments can be deduced and implemented by a person skilled in the art on reading the present description and the attached figures.

In the claims, the word "comprise" does not exclude other elements or other steps. The singular indefinite article does not exclude the plural. A single processor or several other units can be used to implement the invention. The different features presented and/or claimed can be advantageously combined. Their presence in the description or in different dependent claims does not exclude this possibility. The reference signs should not be understood as limiting the scope of the invention.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:
1. A method for controlling the piloting of an aircraft comprising the steps of:

receiving at least one first instruction provided directly by a pilot for modification of the orientation of a current velocity vector of the aircraft, determining a target velocity vector of the aircraft based on said at least one first instruction provided directly by the pilot, and determining, on the basis at least of said target velocity vector, at least one actuation command intended for at least one actuator of the aircraft in order to modify the movement of the aircraft according to said at least one first instruction received, the method further comprising the following steps of:

receiving an instruction for modification of the orientation of the predetermined target velocity vector, modifying the target velocity vector as a function of said command received, said actuation command being determined on the basis of the thus-modified target velocity vector, displaying, in real time, a first graphic element representing a direction of the target velocity vector, and a second graphic element representing a direction of the current velocity vector, and adjusting a current flight path of the aircraft based on comparison of the target velocity vector and the current velocity vector, wherein said target velocity vector is defined directly by the pilot by directing said first graphic element on a control screen, and wherein said current flight path is adjusted, and said at least one actuator of the aircraft is automatically controlled, based on said target velocity vector directly defined by the pilot, without the pilot having to act directly on said at least one actuator.

2. The method according to claim 1, in which said at least one actuator is configured for setting a control surface of the aircraft in motion.

3. The method according to claim 1, in which at least one instruction for modification of the current velocity vector of the aircraft relates to a flight path track angle.

4. The method according to claim 1, in which at least one instruction for modification of the current velocity vector of the aircraft relates to a flight path angle.

5. The method according to claim 1, further comprising the steps of:

detecting a setting of a control surface of the aircraft in motion of a piloting interface, determining said at least one modification instruction as a function of the movement detected.

6. The method according to claim 1, also comprising a step of generating at least one graphic piloting interface display signal comprising a representation of said current velocity vector, said signal being configured to cause the display of a representation of the target velocity vector.

7. The method according to claim 6, further comprising a step of generating a display signal configured to cause the display of an element to aid alignment with a target piloting path, said element being associated with said graphic representation of the target velocity vector.

8. The method according to claim 6, further comprising a step of generating a warning signal in the event of an anomaly in alignment with at least one of the target path and an anomaly in correlation between the target velocity vector and the target path.

9. The method according to claim 6, wherein said at least one signal is configured to cause the display of the representation of the target velocity vector simultaneously with the display of the representation of said current velocity vector.

10. A computer program comprising instructions for the implementation of a method according to claim 1, when it is loaded in non-transient memory and executed by an aircraft piloting control system processor.

11. An aircraft piloting control system comprising
a processing unit configured
to receive at least one first instruction provided directly by a pilot for modification of the orientation of a current velocity vector of the aircraft,
to determine a target velocity vector of the aircraft based on said at least one first instruction provided directly by the pilot, and
to determine, on the basis at least of said target velocity vector, at least one actuation command intended for at least one actuator of the aircraft in order to modify the movement of the aircraft according to said at least one first instruction received,
said processing unit being moreover configured
to receive an instruction for modification of the orientation of the target velocity vector determined, and modify the target velocity vector as a function of said received command, said actuation command being determined on the basis of the thus-modified target velocity vector, and
to display, in real time, a first graphic element representing a direction of the target velocity vector, and a second graphic element representing a direction of the current velocity vector, and adjust a current flight path of the aircraft based on comparison of the target velocity vector and the current velocity vector,
wherein said target velocity vector is defined directly by the pilot by directing said first graphic element on a control screen, and
wherein said current flight path is adjusted, and said at least one actuator of the aircraft is automatically controlled, based on said target velocity vector directly defined by the pilot, without the pilot having to act directly on said at least one actuator.

12. The system according to claim 11, wherein the processing unit is moreover configured to generate at least one graphic piloting interface display signal comprising a representation of said current velocity vector, said signal being configured to cause the display of a representation of the target velocity vector.

13. The system according to claim 12, wherein the processing unit is moreover configured to generate a display signal configured to cause the display of an element for aiding alignment with a target piloting path, said element being associated with said graphic representation of the target velocity vector.

14. An aircraft comprising a system according to claim 11.

15. A method for controlling the piloting of an aircraft comprising the steps of:

receiving at least one first instruction provided directly by a pilot for modification of the orientation of a current velocity vector of the aircraft, determining a target velocity vector of the aircraft based on said at least one first instruction provided directly by the pilot, and determining, on the basis at least of said target velocity vector, at least one actuation command intended for at least one actuator of the aircraft in order to modify the movement of the aircraft according to said at least one first instruction received, the method further comprising the following steps of:

receiving an instruction for modification of the orientation of the predetermined target velocity vector, modifying the target velocity vector as a function of said command received, said actuation command being determined on the basis of the thus-modified target velocity vector, displaying, in real time, a first graphic element representing a direction of the target velocity vector, and a second graphic element representing a direction of the current velocity vector, and adjusting a current flight path of the aircraft based on comparison of the target velocity vector and the current velocity vector, at least one of:

in a manual mode by the pilot, and in an automatic mode by a flight control unit, wherein deviations between the first graphic element and the second graphic element are corrected by the pilot in the manual mode, and are corrected by the flight control unit in the automatic mode, such that the current velocity vector substantially follows the target velocity vector, both velocity vectors being represented by the first and second graphic elements, wherein said target velocity vector is defined directly by the pilot by directing said first graphic element on a control screen, and wherein said current flight path is adjusted, and said at least one actuator of the aircraft is automatically controlled, based on said target velocity vector directly defined by the pilot, without the pilot having to act directly on said at least one actuator.

16. An aircraft piloting control system comprising a processing unit configured to receive at least one first instruction provided directly by a pilot for modification of the orientation of a current velocity vector of the aircraft, to determine a target velocity vector of the aircraft based on said at least one first instruction provided directly by the pilot, and to determine, on the basis at least of said target velocity vector, at least one actuation command intended for at least one actuator of the aircraft in order to modify the movement of the aircraft according to said at least one first instruction received, said processing unit being moreover configured to receive an instruction for modification of the orientation of the target velocity vector determined, and modify the target velocity vector as a function of said received command, said actuation command being determined on the basis of the thus-modified target velocity vector, and to display, in real time, a first graphic element representing a direction of the target velocity vector, and a second graphic element representing a direction of the current velocity vector, and adjust a current flight path of the aircraft based on comparison of the target velocity vector and the current velocity vector, at least one of:

in a manual mode by the pilot, and in an automatic mode by a flight control unit, wherein deviations between the first graphic element and the second graphic element are corrected by the pilot in the manual mode, and are corrected by the flight control unit in the automatic mode, such that the current velocity vector substantially follows the target velocity vector, both velocity vectors being represented by the first and second graphic elements, wherein said target velocity vector is defined directly by the pilot by directing said first graphic element on a control screen, and wherein said current flight path is adjusted, and said at least one actuator of the aircraft is automatically controlled, based on said target velocity vector directly defined by the pilot, without the pilot having to act directly on said at least one actuator.

\* \* \* \* \*